RECORDING ROLL MESSAGE DEVICE

Filed April 13, 1948 2 SHEETS—SHEET 1

INVENTOR.
PAUL BOZOKY
BY
McMorrow, Berman & Davidson
ATTORNEYS

INVENTOR.
PAUL BOZOKY
BY
McMorrow, Berman & Davidson
ATTORNEYS

Patented Oct. 30, 1951

2,573,303

UNITED STATES PATENT OFFICE 2,573,303

RECORDING ROLL MESSAGE DEVICE

Paul Bozoky, Weirton, W. Va.

Application April 13, 1948, Serial No. 20,702

2 Claims. (Cl. 274—17)

This invention relates to message recording and reproducing devices, and more particularly to an instrument of the phonograph type wherein spoken words or messages are recorded on a cylindrical tablet which may be collapsed to a substantially flat condition for mailing.

A main object of the invention is to provide a novel and improved recording and reproducing instrument which is very simple in construction, easy to operate and which is of especial value to physically handicapped persons who are unable to read or write or to persons, who by reason of insufficient education, are unable to read or write.

A further object of the invention is to provide an improved recording and reproducing system wherein a record of the spoken message is made on a cylindrical tablet which may be collapsed to a substantially flat condition for mailing, the apparatus employed being sturdy in construction, dependable in operation and compact in size.

Further objects and advantages of the invention will become apparent from the following description and claims, and from the accompanying drawings, wherein:

Figures 1, 2, 3:
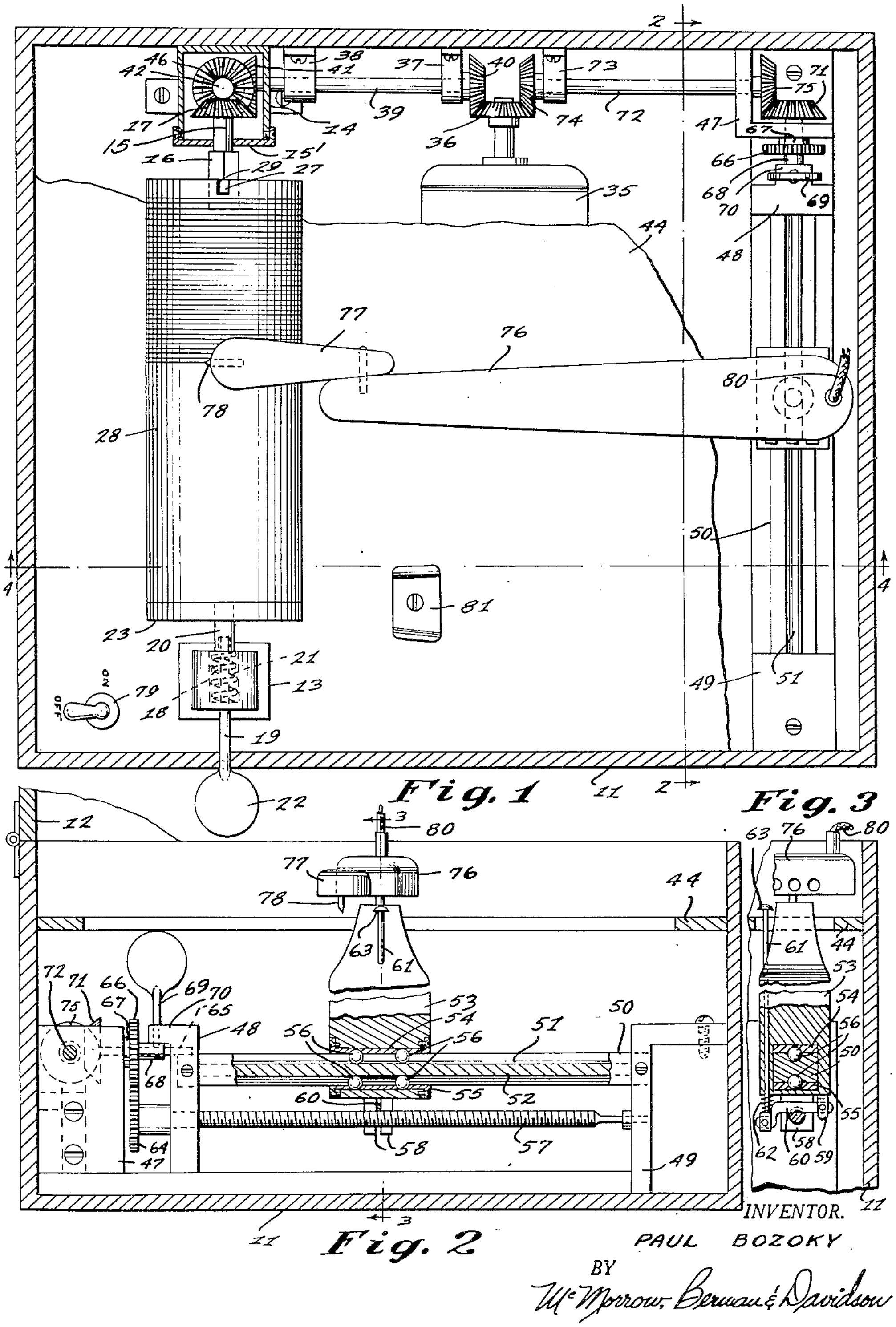
Figure 1 is horizontal cross-sectional view with parts broken away, of a recording and playback device constructed in accordance with the present invention.
Figure 2 is a fragmentary cross-sectional view taken on line 2—2 of Figure 1.
Figure 3 is a fragmentary cross-sectional view taken on line 3—3 of Figure 2.

Referring to the drawings, 11 designates a generally rectangular cabinet or housing having a top cover 12 hinged thereto.

Secured to the bottom wall of housing 11 adjacent the rear wall thereof and at one side of the housing is an upstanding standard or bracket 13. Secured to the bottom wall of the housing at the other side thereof is a second standard or vertical housing 14 having a detachable inner vertical cover pan 15'. Journalled in the upper portion of cover pan 15' is a shaft element 15 formed at its outer end with an enlarged squared portion 16 and at its end inside housing 14 with a bevel gear 17. The top end of bracket 13 is formed with a bore 18 axially aligned with shaft element 15, and extending slidably through the end wall of the bore 18 is a rod member 19 to the end of which a cylindrical stud 20 is axially secured. A coiled spring 21 encircles rod member 19 inside bore 18 and bears between the end wall of the bore and the stud 20 biasing said stud axially in the direction of shaft element 15. Rod member 19 is provided with a finger tab 22 and the side wall of cover 12 is suitably slotted so that shaft 19 will be received in the slot of said side wall when the cover is closed, the finger tab 22 being outside of the housing 11, as shown in Figure 1.

Designated at 23 is a hollow record-supporting cylinder formed axially thereof at one end wall with a circular opening 24 and at the other end wall with a square opening 25. Opening 24 is adapted to fit rotatably on stud 20 and the opening 25 is adapted to interlock with the squared stud 16. The cylinder may thus be rotatively supported in the housing 11 in the manner shown in Figure 1.

Figures 4, 5, 6, 7, 8:
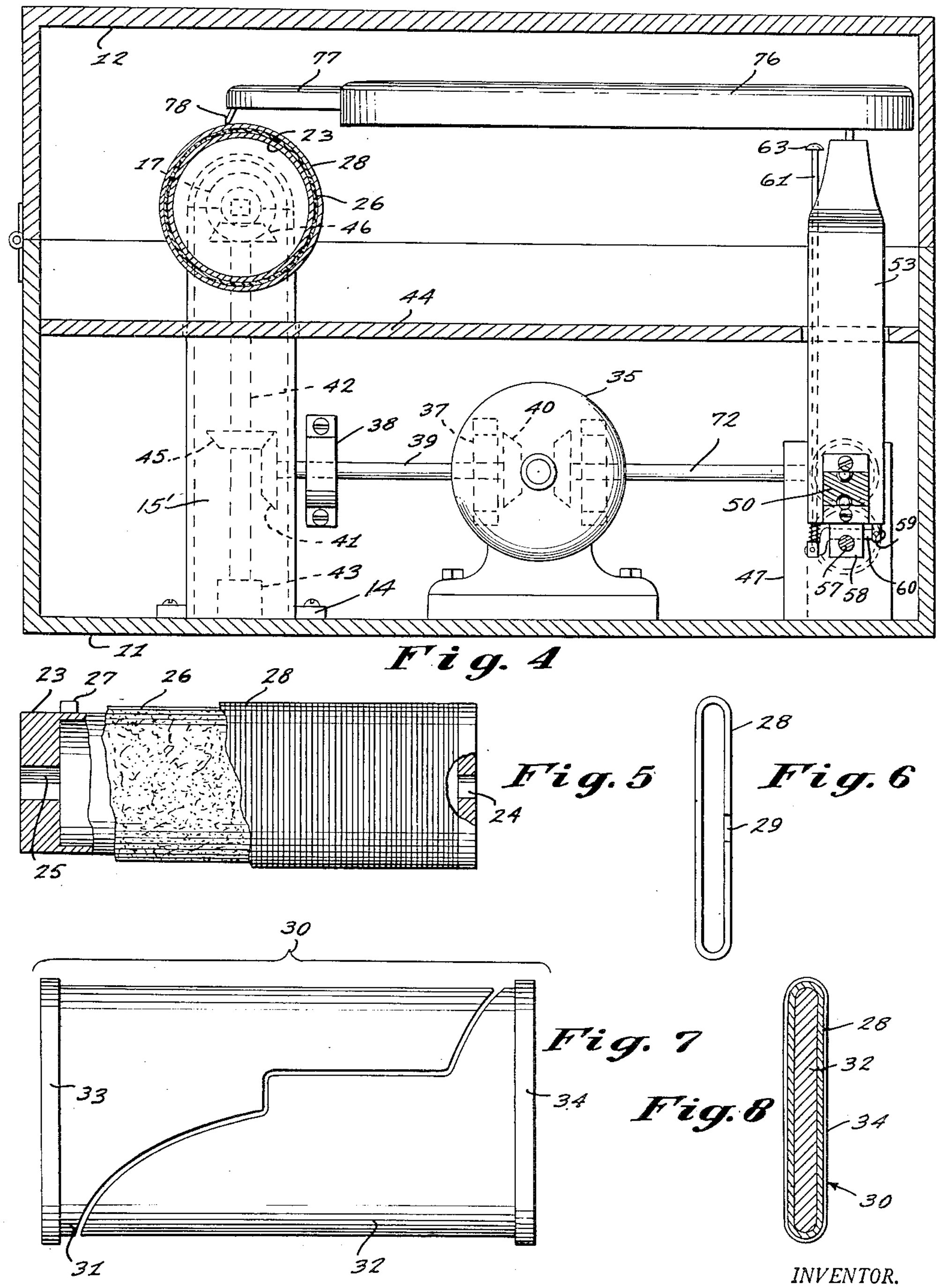
Figure 4 is a vertical cross-sectional view taken on line 4—4 of Figure 1.
Figure 5 is an elevational detail view, partly broken away, of the recording tablet and its supporting roll as employed in the device of Figure 1.
Figure 6 is an end elevational view of the recording tablet of Figure 4 collapsed to a substantially flat condition.
Figure 7 is a front elevational view of a mailing form employed to hold the tablet of Figure 6 in its collapsed condition.
Figure 8 is a transverse cross-sectional view taken through the mailing form of Figure 7 showing a collapsed tablet supported thereon.

The cylinder is provided with an outer cover pad 26 of felt or the like, and adjacent one end of the cylinder is an outwardly projecting lug 27. Designated at 28 is a record tablet of suitable flexible recording material which is removably fitted on the cylinder and which is formed at one end with a notch 29 adapted to interlock with lug 27 to prevent the tablet from slipping around the cylinder during recording or playback of the record. When the flexible tablet 28 is removed from the cylinder it may be collapsed to a substantially flat condition, as shown in Figure 6. It may be retained in said flat condition by means of a form 30, shown in Figure 7, comprising interfitting segments 31 and 32 which may be slipped into the tablet from each end. The segments 31 and 32 are provided with respective enlarged end portions 33 and 34 which engage the edges of the tablet. The tablet is thus retained in its flattened condition by form 30 and may be conveniently stored, handled or mailed without damage thereto.

Designated at 35 is an electric motor which is mounted on the bottom wall of housing 11.

The shaft of motor 35 carries a bevel gear 36. Journalled in brackets 37 and 38 secured to the side wall of housing 11 is a shaft 39. Shaft 39 carries a bevel gear 40 at one end which meshes with bevel gear 36. At its other end, shaft 39 projects into housing 14 and carries a bevel gear 41. Designated at 42 is a vertical shaft journalled in a bottom bearing bracket 43 located inside housing 14 and secured to the bottom wall of housing 11. Housing 14 projects vertically through a horizontal partition panel 44 secured to the side walls of said housing overlying the motor 35. Shaft 42 carries a first bevel gear 45 meshing with bevel gear 41 and a second bevel gear 46 meshing with the bevel gear 17.

Designated at 47 is a vertical angle bar secured to one forward corner portion of housing 11, and secured in the housing inwardly adjacent bar 47 is a vertical bracket 48. Secured to the other forward corner portion of the housing is a vertical bracket member 49. Secured to brackets 48 and 49 is a horizontal track bar 50 formed with top and bottom longitudinal grooves 51 and 52. Designated at 53 is a vertical support member through the lower portion of which track bar 50 passes, said lower portion being provided with ball bearing retaining plates 54 and 55 in which are positioned bearing balls 56 engaging the grooves 51 and 52. Journalled in the brackets 48 and 49 below track bar 50 is a lead screw 57 and rotatively engaged therewith are spaced depending apertured elements 58, 58 carried by the bottom of support 53. Pivotally connected to a lug 59 depending from support 53 and slidably fitting between elements 58, 58 is an arm 60 interengaging with the threads on screw 57. Passing slidably through support 53 on the side opposite to lug 59 is a vertical rod 61 which is connected at its bottom end to arm 60. A coiled spring 62 encircles the lower portion of rod 61, bearing between the bottom of support 53 and the end of the rod, biasing said rod downwardly whereby arm 60 is urged into threaded engagement with screw 57. The top end of rod 61 is provided with a knob 63 whereby the rod may be at times lifted so as to disengage arm 60 from screw 57, freeing support 53 for endwise movement with respect to screw 57. The support 53 is held at all times in a vertical position by the cooperation of the bearing balls 56 with the race grooves 51 and 52.

Screw 57 carries at one end a gear 64. Journalled in the upper portions of bar 47 and bracket 48 is a shaft 65 to the intermediate portion of which is splined a gear 66 meshing with gear 64 in the position thereof shown in Figure 2. Interposed between gear 66 and bar 47 on shaft 65 is a spacing washer 67. Rotatably and slidably mounted on shaft 65 is a sleeve 68 normally locked in the position of Figure 2 by a vertical pin 69 passing through an arm 70 at the top end of bracket 48. When pin 69 is raised to free sleeve 68 the gear 66 may be moved to the right, as viewed in Figure 2, to disengage it from gear 64.

Shaft 65 carries at its end a bevel gear 71. Designated at 72 is a horizontal shaft journalled in bar 47 and in a bearing bracket 73 secured to the side wall of housing 11. Shaft 72 carries at one end a bevel gear 74 meshing with bevel gear 36 and at its other end a bevel gear 75 meshing with bevel gear 71.

Secured to the top end of support 53 is a pickup arm 76 and pivotally connected to the free end thereof is a head element 77 overlying the record cylinder and having the usual depending needle 78. Head element 77 is of a type which may be employed both as a record cutting means and as a reproducing means, such as a head of the magnetic type. The details of head 77 are well known per se and form no part of the present invention.

Designated at 79 is a conventional control switch for the motor line circuit.

In making a record, a conventional microphone and amplifier are employed, the output terminals of the amplifier being connected to the recording head 77 by a connection cord 80 extending through arm 76. Switch 79 is closed to energize motor 35. Cylinder 23 is rotated by gears 36 and 40, shaft 39, gears 41 and 45, shaft 42, gear 17, shaft 15 and stud 16. At the same time, support 53 is moved laterally by the rotation of screw 57, said screw being rotated by gears 64 and 68, shaft 65, gears 71 and 75, shaft 72 and gears 74 and 36. A helical groove is therefore cut on the tablet 28, said groove being formed with undulations corresponding to the sound impulses delivered to the microphone.

In reproducing a record, the cord 80 is connected to an amplifier provided at its output terminals with a suitable loud speaker. When the motor 35 is energized, the tablet is rotated at the same speed as when the record was made and pickup arm 76 follows the lateral movement of the needle 78 in the grooves of the tablet in the same manner as during the sound recording process.

To adjust the pick up arm to any desired position with respect to the tablet, knob 63 is raised, disengaging arm 60 from screw 57 and allowing support 53 to be freely moved to its desired position.

To remove the cylinder 23, finger tab 22 is pulled outwardly disengaging stud 20 from aperture 24 and allowing the cylinder to be disengaged from squared stud 16. The cylinder is replaced by pulling outwardly on tab 22, engaging stud 16 in square aperture 25 of the cylinder, and releasing tab 22 to allow stud 20 to enter opening 24 under the biasing force of spring 21.

A suitable arm rest 81 is secured to panel 44, said arm rest being preferably of the spring clamp type. The pickup arm 76 is adapted to be received in the arm rest 81 and held against undesired movement thereby when the apparatus is being transported from place to place.

While a specific embodiment of a sound recording and reproducing apparatus has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a sound recording and reproducing apparatus, a base adapted to be supported on a horizontal surface, a first standard arranged adjacent one end of said base and fixedly secured to the latter, a horizontally disposed stud shaft mounted on said standard for rotation about a horizontal axis, a second standard arranged in parallel spaced relation with respect to said first-named standard and fixedly supported on said base, a second horizontally disposed stud shaft arranged in aligned relation with said first named stud shaft and rotatably supported on said second-named standard, a cylinder disposed between said stud shafts, means on one end of said first-named stud shaft and engaging the adjacent end of said cylinder for rotatably supporting said end on said standard, a recording tablet supported on said cylinder, means on one end of said second-named stud shaft and engaging the adjacent end of said cylinder for rotatably supporting said end on said second standard, a rod member positioned in aligned relation with the other end of said second named stud shaft and movable into and out of engagement with said other end, resilient means circumposed about said rod member and operatively connected to said second named stud shaft for normally urging the latter toward said first-named stud shaft, screw feed means arranged in parallel spaced relation with said cylinder and mounted for rotation about a horizontal axis, a support, mounting means connected to said support and engageable with said screw feed for mounting said support for movement along said screw feed, a pick-up arm having one end carried by said support, transducer means on the other end of said pick-up arm in engagement with said recording tablet, a gear carried by the other end of said first-named stud shaft, and a driving mechanism operatively connected to said screw feed means and said gear for effecting rotation of the latter.

2. In a sound recording and reproducing apparatus, a base adapted to be supported on a horizontal surface, a first standard arranged adjacent one end of said base and fixedly secured to the latter, a horizontally disposed stud shaft mounted on said standard for rotation about a horizontal axis, a second standard arranged in spaced parallel relation with respect to said first named standard and fixedly supported on said base, a second horizontally disposed stud shaft arranged in aligned relation with respect to said first named stud shaft and rotatably supported on said second named standard, a cylinder disposed between said stud shafts, means on one end of said first named stud shaft and engaging the adjacent end of said cylinder for rotatably supporting said end on said standard, a recording tablet supported on said cylinder, means on one end of said second named stud shaft and engaging the adjacent end of said cylinder for rotatably supporting said end on said second standard, a rod member positioned in aligned relation with the other end of said second named stud shaft and movable into and out of engagement with said other end, resilient means circumposed about said rod member and operatively connected to said second named stud shaft for normally urging the latter toward said first named stud shaft, screw feed means arranged in parallel spaced relation with said cylinder and mounted for rotation about a horizontal axis, a support, mounting means connected to said support and engageable with said screw feed for mounting said support for movement along said screw feed, said mounting means comprising an arm extending transversely of said screw feed and pivotally mounted on said support for movement into and out of threaded engagement with said screw feed, resilient means operatively connected to said arm for biasing the latter into said position of engagement, and manually actuated means operatively connected to said arm for selectively effecting the movement of the latter out of said position of engagement, a pick-up arm having one end carried by said support, transducer means on the other end of said pick-up arm in engagement with said recording tablet, a gear carried by the other end of said first named stud shaft, and a driving mechanism operatively connected to said screw feed means and said gear for effecting rotation of the latter.

PAUL BOZOKY.

REFERENCES CITED

The following references are of record in the file of this patent:

UNITED STATES PATENTS

| Number | Name | Date |
|---|---|---|
| 408,649 | Brown | Aug. 6, 1889 |
| 511,402 | Bruening | Dec. 26, 1893 |
| 628,333 | Kattell | July 4, 1899 |
| 703,939 | Madison | July 1, 1902 |
| 920,324 | Haines | May 4, 1909 |
| 1,768,200 | Hoffman | June 24, 1930 |
| 1,794,354 | Aversa | Mar. 3, 1931 |
| 1,966,654 | Stowell | July 17, 1934 |
| 1,973,081 | Kliser | Sept. 11, 1934 |
| 2,279,227 | Dunning et al. | Apr. 7, 1942 |
| 2,380,754 | Hardy | July 31, 1945 |